Nov. 2, 1926.
H. T. HUGHES
1,605,407
NONSKID CHAIN
Filed Feb. 5, 1923
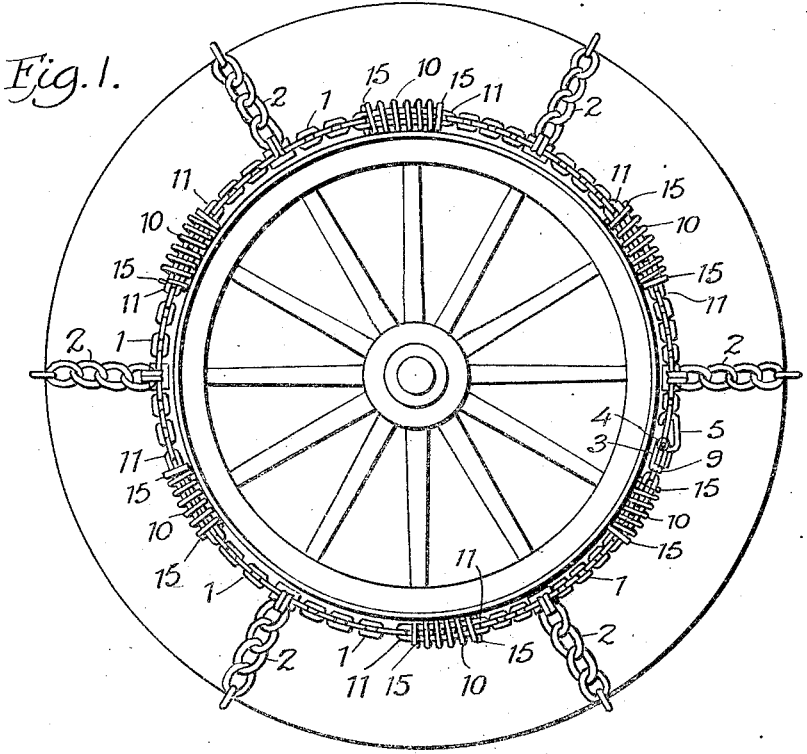
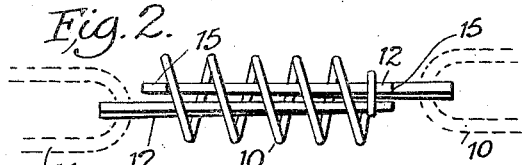
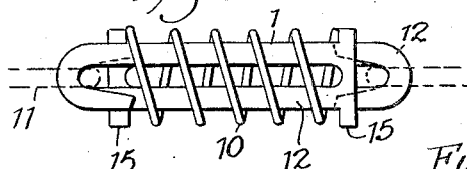
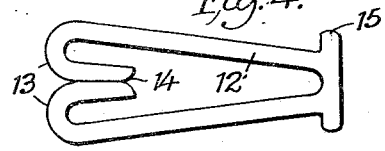
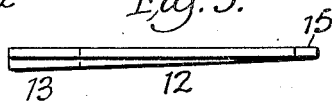
Inventor
Hugh T. Hughes,
By Wm M Monroe,
Attorney.

Patented Nov. 2, 1926.

1,605,407

UNITED STATES PATENT OFFICE.

HUGH T. HUGHES, OF CLEVELAND, OHIO, ASSIGNOR OF ONE-HALF TO ALBERT CROST, OF CLEVELAND, OHIO.

NONSKID CHAIN.

Application filed February 5, 1923. Serial No. 617,083.

The objects of the invention are to provide simple and efficient means for resiliently connecting parts of the longitudinal chains of an anti-skid chain for the tires of a motor car which serve to cause the chain to fit the tire closely, and to take up any looseness in an oversize chain, and which also serve to provide yielding elements in the chain which prevent it from breaking when the brake is suddenly applied to the wheel.

These yielding elements form units which are attachable to any chain and can be quickly supplied when the chains become broken from any unexpected cause, and thus form means for road repair and can be separately carried in the tool box of the car.

The invention also has reference to a lever actuated connecting device for the ends of the chain which permits the ends of the chain to be quickly connected about the tire at any time without any difficulty, by unskilled hands.

The invention comprises the combination and arrangement of parts and construction of details hereinafter described, shown in the accompanying drawings and specifically pointed out in the claims.

In the accompanying drawings, Fig. 1 is a side elevation of a tire showing the mode of application of the device thereto.

Fig. 2 is a plan of the resilient element.

Fig. 3 is a side elevation thereof.

Fig. 4 is a plan of the sheet metal stamping from which the holding devices of the resilient elements are made before it has been formed into an elongated eye.

Fig. 5 is an edge view thereof.

In these views, 1 represents the longitudinal or long circumferential members of the nonskid chain, and 2, the transverse connecting members.

3 is a lever which is pivoted at 4 to one end of each side chain and which is provided with a hooked end 5, which is first inserted into the outer link, of the opposite end of the chain, and then by means of the lever end is turned backward to form a hook 9 which connects the opposite ends of the chain together.

At 10, the resilient coiled springs are shown interposed between links 11, 11 of the longitudinal chains and form resilient elements therein. These springs are held between the loops 12, 12 which are passed side by side in reversed positions through the coils of the springs.

These loops may be formed of wire but are preferably formed of sheet metal as follows:

First the blank 12' shown in Figs. 4 and 5 is stamped from the metal sheet, having the hooked ends 13 applied together but separated on the axial line 14. These extremities are then brought together and overlapped to close the loop at that end, thus forming a loop closed at both ends but having its hooked ends easily separated for the insertion of the chain link at that end.

The opposite end of the loop is provided with a T head 15, which is engaged by one end of the coil of the spring, the other end of the coil being engaged by the head of the adjacent loop which is reversed in position as shown in Figs. 2 and 3.

In this manner when a sudden strain is brought upon the resilient element, the coiled spring will be compressed between the T heads of the loops, and the element will yield and prevent the chain from breaking.

This device is simple, efficient and of slight initial cost, and can be furnished with the chains and carried in the repair kit in the machine to enable the driver to repair a broken chain while upon the road.

These devices can also be applied to standard chains of any make and can be applied by unskilled labor with the greatest ease.

Having described the invention what I claim as new and desire to secure by Letters Patent is:

1. In a resilient section for the purpose set forth, a coiled spring, a pair of draw members positioned therein in reversed positions, each draw member provided with a T-shaped head at one end, a central slot, and with hooked and overlapping extremities at the other end.

2. In a device of the character described, a sheet metal draw element, said element centrally slotted to form an elongated loop or eye, one extremity of said loop provided with laterally extended sides forming a T-shaped head thereon, and the other extremity provided with hook shaped overlapping ends.

3. In a resilient element for connecting the ends of the side members of a nonskid chain, a coiled spring and a pair of draw members reversely positioned therein, each member having a longitudinal opening therethrough, one extremity of each member being closed and having laterally extended lugs engageable with one end of said coiled spring and the other extremity being also closed and having split and overlapping ends and detachably engageable with one end of said nonskid chain, substantially as described.

In testimony whereof, I hereunto set my hand this 13th day of January 1923.

HUGH T. HUGHES.